United States Patent [19]
Deutsch et al.

[11] Patent Number: 6,028,870
[45] Date of Patent: Feb. 22, 2000

[54] SOLID STATE LASER AND A METHOD OF ADJUSTING THE PULSE ENERGY OF A SOLID STATE LASER

[75] Inventors: Nils Deutsch; Wolfgang Zschocke; Uwe Stamm, all of Göttingen, Germany

[73] Assignee: Lamba Physik Gesellschaft zur Herstellung Von Lasern mbH, Germany

[21] Appl. No.: 08/927,102

[22] Filed: Aug. 28, 1997

[30] Foreign Application Priority Data

Aug. 29, 1996 [DE] Germany ............... 196 34 969

[51] Int. Cl.⁷ ........................................ H01S 3/10
[52] U.S. Cl. ............................... 372/25; 372/108
[58] Field of Search ........................ 372/25, 108

[56] References Cited

U.S. PATENT DOCUMENTS

| | | | |
|---|---|---|---|
| 3,918,007 | 11/1975 | Waksberg | 331/94.5 M |
| 4,546,477 | 10/1985 | Richards | 372/12 |
| 5,197,074 | 3/1993 | Emmons, Jr. et al. | 372/26 |
| 5,559,816 | 9/1996 | Basting et al. | 372/27 |

FOREIGN PATENT DOCUMENTS

| | | | |
|---|---|---|---|
| 2225277 | 5/1972 | Germany . | |
| 2 225 277 | 12/1973 | Germany | H01S 3/11 |
| 1 333 892 | 1/1972 | United Kingdom | H01S 3/11 |

OTHER PUBLICATIONS

Grau et al, "Modulation von Licht . . . "; Zeitschrift f,ür angewandte Physik; pp 16–20, 1964.

P. Peuser & N.P. Schmitt, "*Diodengepumpte Festkörperlaser*," Springer–Verlag Berlin Heidelberg, 1995, book cover and copyright pages, pp. 234–237 and pp. 313–314 (in German) no month.

V.G. Grau, K. Gürs, R. Müller & D. Rosenberger, "Modulation von Licht mittels elektrisch doppelbrechender Kristalle," *Zeitschrift für angewandte Physik* XVII Band, Heft 1, 1964, pp. 16–20 (in German), no month.

D.W. Hughes & J.R.M. Barr, "Laser diode pumped solid state lasers," *J. Phys. D: Appl. Phys.*, vol. 25, 1992, pp. 563–586, no month.

R.S. Afzal & M.D. Selker, "Simple high–efficiency $TEM_{00}$ diode–laser pumped Q–switched laser," *Optics Letters*, vol. 20, No. 5, Mar. 1, 1995, pp. 465–467.

Y.K. Park & R.L. Byer, "Electronic Linewidth Narrowing for Single Axial Mode Operation of Q–Switched Nd:YAG Lasers," *Optics Communications*, vol. 37, No. 6, Jun. 15, 1981, pp. 411–416.

J.M. Plorin, A. Mehnert, P. Peuser & N.P. Schmitt, Diode–Pmped, Actively Stabilized 1 W Single–Frequency–Laser for Optical Measurement and Testing, *Laser in der Technik Laser in Engineering*, Laser 91, Springer–Verlag Berlin Heidelberg 1992, pp. 103–107, no month.

J–C Lee, S.D. Jacobs, T. Gunderman, A. Schmid, T.J. Kessler & M.D. Skeldon, "$TEM_{00}$–mode and single–longitudinal–mode laser operation with a cholesteric liquid–crystal laser end mirror," *Optics Letters*, vol., 15, No. 17, Sep. 1, 1990, pp. 959–961.

V. Evtuhov & A.E. Siegman, "A 'Twisted–Mode' Technique for Obtaining Axially Uniform Energy Density in a Laser Cavity," *Applied Optics*, vol. 4, No. 1, Jan. 1965, pp. 142–143.

*Primary Examiner*—Rodney Bovernick
*Assistant Examiner*—Robert E. Wise
*Attorney, Agent, or Firm*—Limbach & Limbach L.L.P.

[57] ABSTRACT

A solid state laser, especially a solid state laser pumped by laser diodes (3b, 3c) comprises a polarizing beam splitter (5) to couple out from the resonant cavity some part (11) of the radiation energy. An electro-optic modulator (Pockels' cell) (4) serving as couple-out modulator is adjusted such that the ratio of the pulse energy of the laser beam pulses (10) emitted to the coupled-out part (11) of the radiation energy is variable and thus the pulse energy is adjustable by keeping the pulse duration constant.

31 Claims, 3 Drawing Sheets

SOLID STATE LASER AND A METHOD OF ADJUSTING THE PULSE ENERGY OF A SOLID STATE LASER

FIELD OF THE INVENTION

The instant invention relates to solid state lasers and methods of adjusting the pulse energy of such solid state lasers, especially solid state lasers which are pumped by laser diodes.

BACKGROUND OF THE INVENTION

Many varieties of solid state lasers are known of which the solid state laser medium is pumped by laser diodes (DPSSL: Diode Pumped Solid State Laser).

The instant invention is concerned, among others, with the problem of how to adjust the energy of laser beam pulses as emitted by a diode pumped solid state laser.

A quality switch (Q-switch)—also referred to as Q-control—is understood as being a method of generating short, high peak power laser pulses by interrupting the beam path in the optical cavity resonator by means of an optical switch (Q-switch) so as to prevent the laser from starting until the population inversion caused by the pumping process lies way above the value determined by the threshold condition. Only then does the Q-switch clear the beam path, in other words it controls the quality of the optical resonator so that the laser can start, and the energy stored in the active laser medium will be emitted in the burst of a very short, intensive laser radiation pulse. Pulse lengths in the range of nano seconds are quite typical.

Known methods of adjusting the pulse energy of Q-switched solid state lasers operate by adjustment of the desired output energy of the laser pulses on the basis of the pumping energy introduced into the laser medium, respectively the amount of the energy used by the Q-switch pulse. The known methods of adjusting the pulse energy may be classified in three groups:

(1) The intensity of the pump radiation and thus the energy stored in the laser medium is varied, at constant duration or length of the pumping pulse.

(2) The duration or length of the pumping pulse and thus the energy stored in the laser medium is varied, at constant intensity of the pump radiation.

(3) The intensity and the duration or length of the pumping pulse remain unchanged; the energy of the laser pulse emitted is controlled by opening the Q-switch at a time when the energy stored in the laser medium has reached a certain value.

These known methods give rise to technical problems. In the case of the methods listed sub (1) and (2) above, the mean optical power introduced into the laser medium varies and, therefore, also the thermal loading of the solid state laser medium varies and, as a consequence thereof, the so-called thermally induced lens and the thermally induced double refraction undergo changes. With methods (1) and (2) it is especially the thermally induced lens in the laser medium which causes difficulty because normally the laser resonator is optimized, being tuned precisely to a certain pumping energy or average pumping power and, therefore, being adjusted to a very specific thermal lens (variation of the pumping energy consequently may lead to maladjustment and loss of optimization).

In the case of method (3) it is not the thermally induced lens which is causing the problem because the mean energy introduced into the laser medium remains constant, and only warming up of the laser medium by the laser beam itself can influence the characteristics of the thermally induced lens. Due to the very low absorption of the laser radiation in the laser medium, however, these effects usually are minor (yet measurable) with the method described sub (3). It is a disadvantage of this third method that the length in time of the laser pulses is highly dependent on the adjusted pulse energy. The laser pulse duration, among others, is a function of the amplification in the laser medium and that depends on the energy introduced into the laser medium up to the moment the Q-switch (e.g. Pockels' cell) switches. This is a difficulty which basically occurs with methods (1) and (2) as well. With them, however, the principal disadvantage is the effect brought about by the thermally induced lens in the laser medium. Varying the pulse length while varying the pulse energy is undesirable especially for certain applications of the laser, such as optically non-linear processes (producing higher harmonics of the laser radiation, optical parametric processes) or where laser radiation is applied in time-dependent examinations.

The modulation of light for purposes of data transmission is described in a paper by G. Grau, K. Gürs, R. Müller, and D. Rosenberger entitled "Modulation von Licht mittels elektrisch doppelbrechender Kristalle", published in the journal Zeitschrift für angewandte Physik, 1964, vol. 17. no. 1, pages 16 to 20. Information to be transmitted is impressed upon a laser pulse while the pulse endures. This prior art does not deal with adjusting the pulse energy. Instead, its interest is focussed on how to achieve quick switch-on and switch-off of the light beam.

U.S. Pat. No. 5,197,074 describes a modulator in a laser cavity resonator by means of which the resonant quality is adjustable for the purpose of adjusting the pulse energy of the laser pulses emitted.

SUMMARY OF THE INVENTION

It is an object of the invention to provide a solid state laser and a method of operating the same by which the problems known in the art and mentioned above can be overcome. It is also an object of the invention to make the pulse energy of the laser adjustable in a simple way, without entailing disadvantages in terms of adjustment or optimization and without changing the pulse duration of the laser when varying the adjusted pulse energy.

In accordance with the method of the invention for adjusting the pulse energy of a solid state laser of the kind mentioned above the coupling out of the laser beam pulses proper is accompanied, at least almost simultaneously, by coupling out from the resonant cavity of the solid state laser another part of the radiation energy obtained in the resonant cavity, yet preferably doing so at a different location from that of the laser beam pulses. With this method, the average pumping power as well as the point in time at which the couple-out modulator is opened preferably are maintained constant. The couple-out modulator is comparable to a conventional Q-switch since it influences the quality of the cavity resonator. In this respect the "couple-out modulator" also might be called a "Q-switch".

Although it is preferred to apply the method according to the invention to a solid state laser, especially a Q-switched solid state laser which is pumped by laser diodes, it may be used analoguosly with other types of Q-switched lasers which are designed for active Q-switching.

The preferred solid state laser according to the invention comprises an electro-optical couple-out modulator, also called Pockels' cell, and an optical means for coupling out from the laser resonant cavity some part of the radiation energy, at the same time as the actual laser radiation pulses are coupled out, so as to adjust the pulse energy of the laser radiation pulses coupled out in response to said part of the radiation energy coupled out. In other words, the radiation energy in the laser resonator is divided into the laser radiation pulses, on the one hand, and the part of the radiation energy coupled out, on the other hand, the division being made so that the resulting laser radiation pulses will be adjusted to the desired pulse energy.

Preferably, this division of the radiation energy is obtained by adjustment of the couple-out modulator which means that the couple-out modulator (and thus the resonator quality) is adjusted so as to vary the pulse energy of the laser radiation pulses emitted in the desired manner, specifically such that they will have the desired, adjusted pulse energy, while all the other radiation parameters remain unchanged. That does not require any variation of the pulse length or of the energy pumped into the laser. And preferably, the pulse length and the pumping energy are not varied although the radiation energy of the individual pulses is varied.

The preferred optical means used for coupling out said part of the radiation energy not used for the laser radiation pulses emitted is a polarizing beam splitter. In this manner, more or less radiation is passed or reflected, depending on the polarization condition of the radiation impinging upon such a polarizing beam splitter. Suitable polarizing beam splitters are known per se (cf. DE 44 38 283).

With this embodiment, therefore, the adjustment of the pulse energy of the laser radiation pulses emitted is accomplished by controlling the electro-optical modul (Pockels' cell) in such a manner that part of the energy inside the resonator is coupled out of the resonator by way of the polarizing beam splitter (polarizer). The Pockels' cell operated as an ON/OFF switch in the prior art (with respect to the resonant cavity quality) thus fulfills two functions in accordance with the instant invention: Q-switching of the cavity resonator and adjustment of the degree of coupling out. When a polarizing beam splitter is used for coupling out from the resonant cavity the part in question of the radiation the laser light emitted from the end mirror (couple-out mirror) of the resonant cavity is linearly polarized.

The invention further offers a ready opportunity for stabilizing the pulse energy of the radiation emitted by a laser (which need not necessarily be a diode pumped solid state laser—instead the teaching is applicable to any laser with active quality modulation (Q-switching). To accomplish that, the invention provides for stabilizing the pulse energy of the laser radiation pulse by measuring the energy thereof in per se known manner by means of a detector (e.g. by coupling out a representative proportion of the energy of the radiation pulses) and applying a signal of the energy detected of the laser radiation pulses to a control element for use in controlling the quality of the laser resonator by means of the Q-switch such that the pulse energy of the laser radiation pulses will have a desired value.

The invention also embraces a certain structure of a solid state laser, especially such as shown in FIG. 2, in other words a diode pumped solid state laser comprising a Pockels' cell as the electro-optical Q-switch between the laser medium and the couple-out mirror of the resonant cavity, a polarizer in the resonant cavity at one side of the laser medium, and a quarter wavelength plate at the other side of the laser medium between the latter and an end mirror of the resonant cavity.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
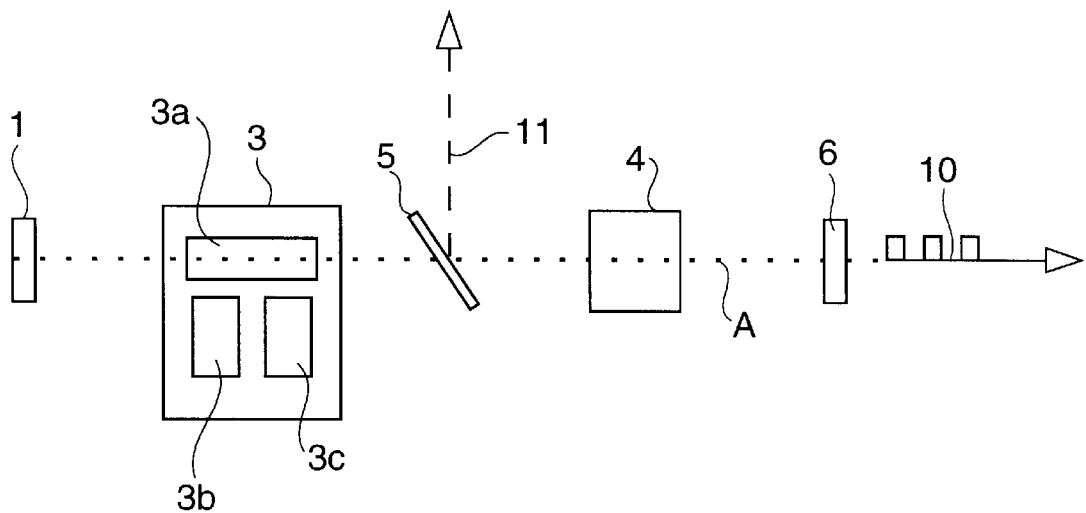
FIG. 1 shows a first embodiment of a solid state laser with adjustable pulse energy.

FIG. 1 shows a laser resonant cavity comprising a highly reflecting mirror 1 and a couple-out mirror 6. A pumping chamber 3 houses the laser medium in the form of a solid 3a (laser rod) which is pumped by at least one laser diode 3b, 3c, in the embodiment shown. A polarizing beam splitter 5 and a Pockels' cell 4 are disposed between the solid laser medium 3a and the couple-out mirror 6. The optical axis of the resonant cavity is marked "A".

The laser radiation pulses 10 (proper) are emitted by the couple-out mirror 6.

The Pockels' cell 4 serves as Q-switch and modulator for adjusting the pulse energies of the laser radiation pulses 10 emitted. The polarizing beam splitter 5 (polarizer) and the Pockels' cell 4 cooperate in such a manner that radiation 11 will be coupled out from the resonant cavity via the polarizing beam splitter 5 when the Q-switch is closed (low resonant cavity quality). When the Q-switch is open (high resonant cavity quality) laser radiation will pass the polarizing beam splitter 5 without obstruction, and the feedback between the two resonator mirrors 1, 6, needed to start the laser, is achieved.

The invention takes advantage of the finding that the resonant cavity quality is adjustable selectively by the high voltage which may be applied to the Pockels' cell. In this manner, the ratio is adjustable of the radiation energy 11 which is coupled out from the resonant cavity at the polarizing beam splitter to the energy of the laser radiation pulses 10 coupled out through the couple-out mirror 6. The higher the adjustment of the resonant cavity quality, the greater the adjusted pulse energy of the laser radiation pulses 10 as against said part of the radiation 11 which is coupled out. The polarizing beam splitter 5 has the effect of polarizing the laser radiation 10 emitted. The other radiation parameters (properties of the beam) remain unchanged.

Pockels' cells, when used for Q-switching, normally are employed En such that either they do not influence linearly polarized light, depending on their switching state, (no voltage at the Pockels' cell) or that they convert it into circularly polarized light (high voltage at the Pockels' cell). This means that the polarization state is changed by the application of high voltage. In the laser resonant cavity an "ON/OFF"-switch is realized by cooperation between the Pockels' cell and a polarizer. This latter aspect is known in the art.

When Pockels' cells are used as Q-switches a distinction is made between two different modes of operation. On the one hand, there is the "down-switch" mode which will be explained with reference to FIG. 1. As soon as a certain voltage is applied, namely the so-called λ/4 voltage, the polarization direction of the radiation turns by 90° upon twice passing the Pockels' cell. This light then can no longer pass through the polarizing beam splitter 5, acting as polarizer. Instead, it is reflected (namely said partial radiation 11) out of the cavity and so the cavity losses of the laser are high enough to prevent laser action, i.e. the Q-switch is closed. In the event of no voltage at the Pockels' cell 4 the radiation in the resonant cavity is not influenced by the Pockels' cell, i.e. the Q-switch is "open".

Figure 2:
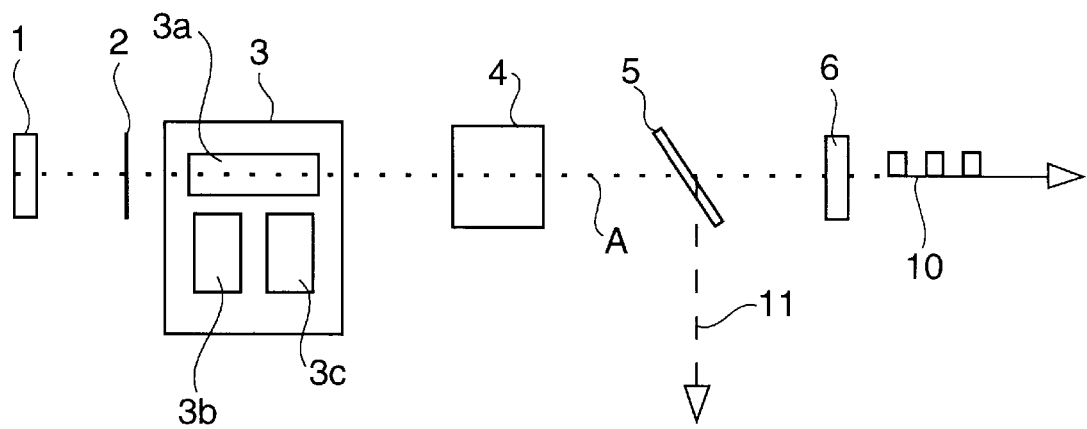
FIG. 2 shows a second embodiment of a solid state laser with adjustable pulse energy.

In the so-called "up-switch" mode, on the other hand, it is made sure that the Q-switch opens when voltage is applied to the Pockels' cell. To this end a quarter wavelength plate is positioned in the resonant cavity and the so-called λ/4 voltage is applied to the Q-switch. FIG. 2 shows the addition of such a quarter wavelength plate 2.

Corresponding structural components or elements serving the same function are identified by like reference numerals throughout the drawings. To describe FIGS. 2, 3, and 4, therefore, reference is merely made to the description of FIG. 1.

A so-called "twisted mode" arrangement is known in the art (P. Peuser, M. Schmitt "Diodengepumpte Festk örperlaser", Springer Verlag, 1995; V. Evtuhov, A. E. Siegmann, Appl. Opt. 4, 1965, S.142). This arrangement comprises two quarter wavelength plates, to the left and right of the solid laser medium, providing better exploitation of the energy pumped into the laser medium. This "twisted mode" operation compensates disadvantageous, uneven energy reduction (spatial hole burning into the population inversion) in the laser medium. As mentioned above, the cited prior art uses two quarter wavelength plates to accomplish that.

The arrangement according to the invention illustrated in FIG. 2 not only makes it possible to save one quarter wavelength plate but in addition also offers some physical advantages. The Pockels' cell in the laser arrangement according to FIG. 1, being operated in a way such that it has the effect of a λ/4 plate (i.e. application of the so-called λ/4 voltage), replaces one quarter wavelength plate and, at the same time, acts as Q-switch. In addition to this simpler structural implementation, reduction of the number of components needed, less complicated set-up procedure, also the losses within the cavity resonator are smaller due to a saving in surface area, and there is less risk of damaging surfaces of optical elements. The embodiment shown in FIG. 2 may be modified such that the positions of components 2 and 4 are exchanged, in other words the electro-optical Q-switch 4 will be disposed between the highly reflecting end mirror 1 and the solid 3a, while the quarter wavelength plate 2 will be located between the solid 3a and the polarizing beam splitter 5.

Figure 3:
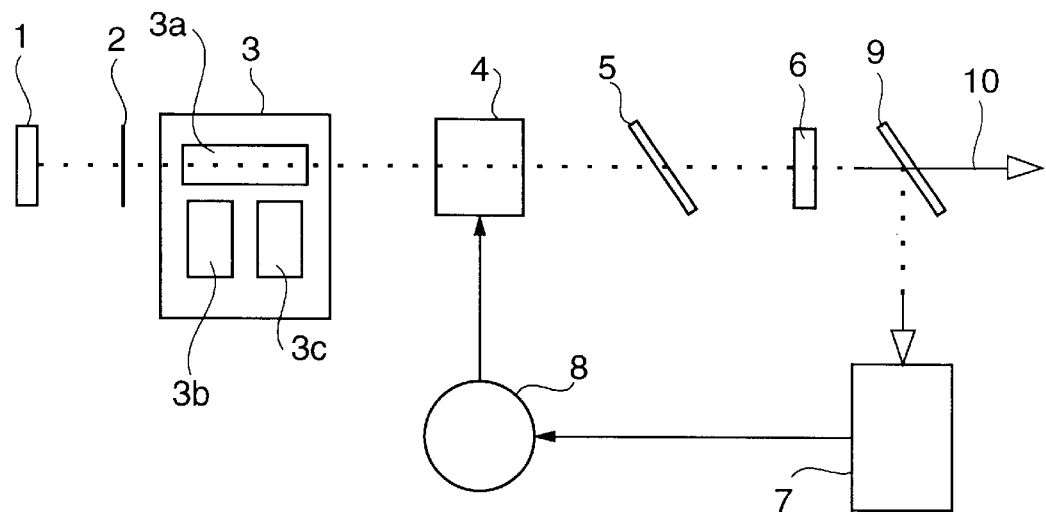
FIGS. 3 and 4 illustrate embodiments of further developments of the solid state laser shown in FIG. 3, comprising means for stabilizing the pulse energy.
Figure 4:
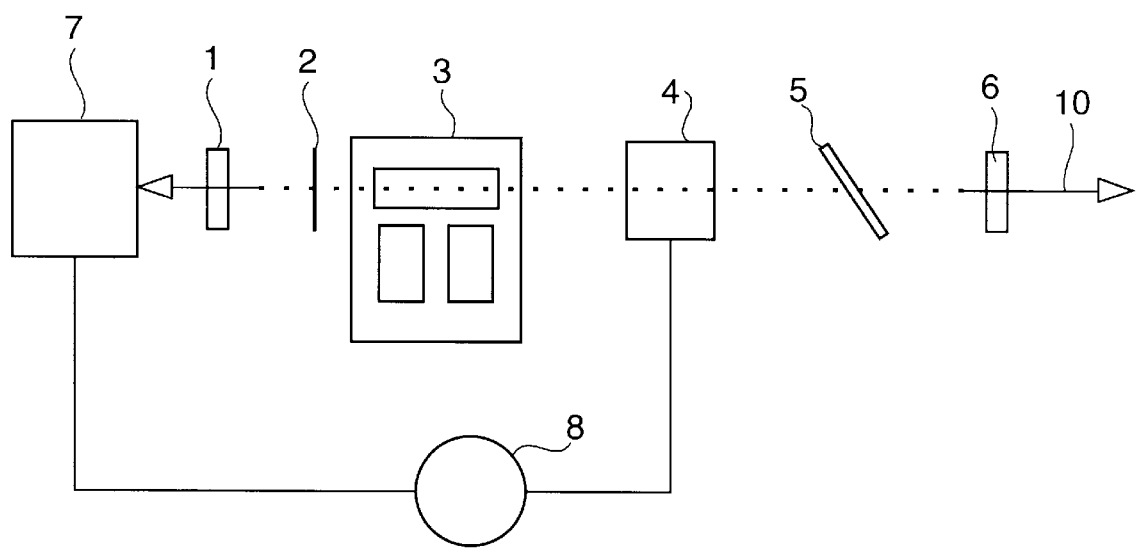

FIGS. 3 and 4 illustrate a further development of the solid state laser arrangement shown in FIG. 2 for adjustment of the pulse energies of the laser radiation pulses 10 emitted.

With the embodiment according to FIG. 3, a small portion of the energy of the laser radiation pulses 10 emitted through the couple-out mirror 6 is directed by a partly reflecting mirror 9 to a radiation detector 7. The detector 7 applies a signal in correspondence with the energy measured of the laser radiation pulses 10 to a control element 8 which in turn controls the high voltage applied to the Pockels' cell 4. In this manner a control circuit is realized by which the energy of the laser radiation pulses 10 emitted can be stabilized by adjusting the high voltage applied to the Pockels' cell 4.

FIG. 4 shows a modification of the embodiment according to FIG. 3. Instead of branching off a minor part of the energy to be measured of the laser radiation pulses 10 by use of a partly reflecting mirror, the embodiment shown in FIG. 4 provides for coupling out a minor part of the radiation energy by the rear end mirror 1 and directing it to an energy detector 7. Further control of the high voltage at the Pockels' cell 4 takes place by a control element 8, in analogy with the embodiment of FIG. 3.

Figure 5:
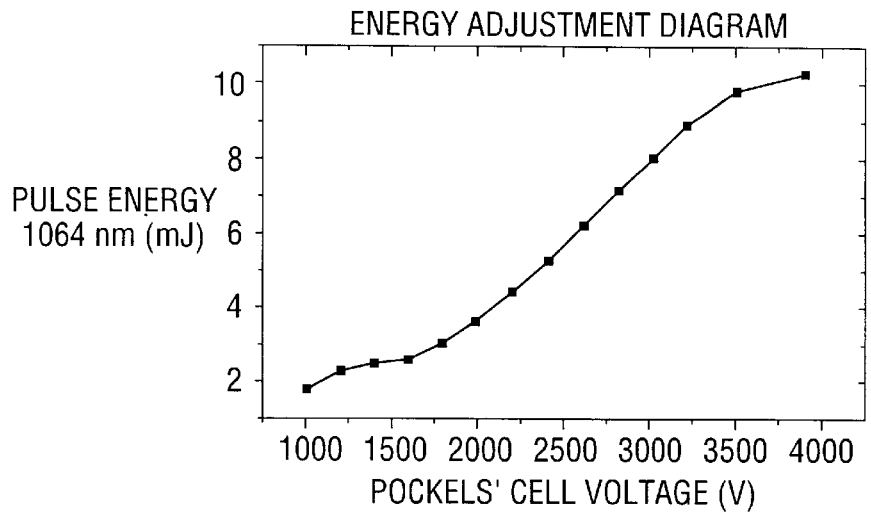
FIG. 5 is a graphic presentation of results of measurements made with a solid state laser as shown in FIG. 2, illustrating the pulse energy variation of the laser radiation pulses emitted in response to the high voltage applied to the Pockels' cell.
Figure 6:
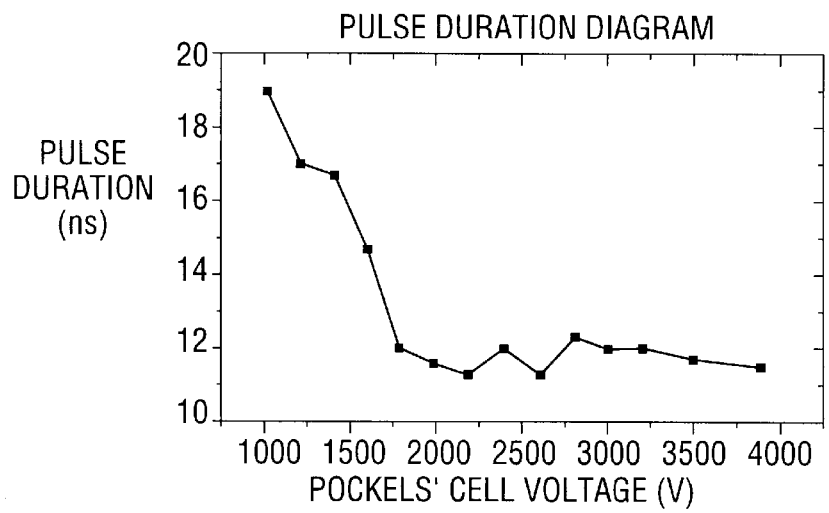
FIG. 6 is a graph illustrating the influence which the high voltage applied to the Pockels' cell has on the pulse duration of the laser pulses emitted.
Figure 7:
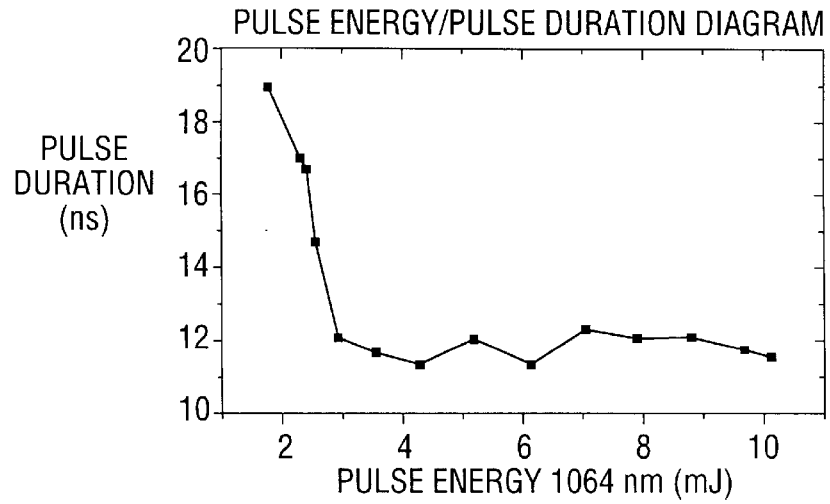
FIG. 7 is a graph illustrating the dependency between the pulse duration and the pulse energy, with the same measuring set-up.

FIGS. 5 to 7 present results of measurements obtained with a special Q-switched diode pumped solid state laser as illustrated in FIG. 2.

In FIG. 5 the high voltage (V) applied to the Pockels' cell 4 is entered on the abscissa, while the pulse energy in mJ at a wavelength of 1064 nm is plotted on the ordinate (i.e. an Nd:YAG laser was used). FIG. 5 demonstrates that the pulse energy is variable by several 10% through proper adjustment of the high voltage at the Pockels' cell.

In FIG. 6 the high voltage (V) applied to the Pockels' cell is entered on the abscissa, while the pulse duration in nano seconds (ns) is reflected on the ordinate. As will be seen, the pulse duration of 12 ns is practically constant between 2000 V and 4000 V. A comparison of this result with that of FIG. 5 makes it clear that the pulse energy may be varied between 3 mJ and 10 mJ by varying the Pockels' cell voltage, without causing a change in the pulse duration.

The diagram of FIG. 7 presents the pulse energy on the abscissa and the pulse duration on the ordinate. As follows from FIGS. 5 and 6 already, the pulse duration is practically constant over a wide interval of pulse energies.

Results such as reported above cannot be achieved with the known means discussed here for adjustment of the pulse energy of Q-switched lasers. With the known methods, rather the pulse duration at small pulse energies would rise from approximately 12 ns to above 100 ns. Moreover, the known methods would lead to an undesired variation of the point in time (beginning) of the laser pulse in the order of several μs. This so-called "jitter" is avoided by the invention, as the measured results demonstrate.

What is claimed is:

1. A method of adjusting the pulse energy of a solid state laser, said solid state laser including a solid state gain medium located within a resonator, said gain medium being pumped by at least one laser diode in order to generate laser radiation, wherein part of the laser radiation is coupled out of the laser resonator at the same time as the laser beam pulses are coupled out, yet at a different location from the laser beam pulses and wherein the pulse energy of the laser beam pulses is adjusted by adjusting the division of energy between the radiation coupled out at the two locations by way of adjustment of a couple-out modulator.

2. The method as claimed in claim 1, wherein said part of the radiation energy is coupled out in go such a way that, apart from the pulse energy, all the other beam parameters of the laser beam pulse, especially the pulse length thereof remain unchanged.

3. A method as recited in claim 1 wherein the couple-out modulator is defined by a magneto-optical device.

4. A method as recited in claim 1 wherein the couple-out modulator is defined by an electro-optical device.

5. A method as recited in claim 4 is a Pockels cell.

6. A method as recited in claim 4 wherein the pulse energy of the laser beam pulses is adjustable by varying the high voltage at the electro-optical couple-out modulator.

7. A method as recited in claim 1 wherein the energy of the laser beam pulses is measured and used to control the operation of the couple-out modulator.

8. A method as recited in claim 7 wherein the measured energy of the laser beam pulses is used to stabilize the energy thereof.

9. A method of adjusting the pulse energy of a laser pumped by at least one other radiation source, wherein part of the laser radiation is coupled out of the laser at the same time as the laser beam pulses are coupled out, yet at a different location from the laser beam pulses, and wherein the pulse energy of the laser beam pulses is adjusted by adjusting the division of energy between the radiation coupled out at the two locations by way of adjustment of a couple-out modulator.

10. A method according to claim 9, wherein said other radiation source is a flash lamp.

11. A method according to claim 9, wherein said laser is a solid state laser.

12. A method as recited in claim 9 wherein the couple-out modulator is defined by a magneto-optical device.

13. A method as recited in claim 9 wherein the couple-out modulator is defined by an electro-optical device.

14. A method as recited in claim 13 is a Pockels cell.

15. A method as recited in claim 13 wherein the pulse energy of the laser beam pulses is adjustable by varying the high voltage at the electro-optical couple-out modulator.

16. A method as recited in claim 9 wherein the energy of the laser beam pulses is measured and used to control the operation of the couple-out modulator.

17. A method as recited in claim 16 wherein the measured energy of the laser beam pulses is used to stabilize the energy thereof.

18. A method as recited in claim 9 wherein the laser is pumped by one of laser diode and a dye-laser.

19. A solid state laser comprising:
   a resonator;
   a solid state gain medium located within the resonator;
   a means for optically pumping the solid state gain medium to generate primary laser output pulses;
   means for coupling out of the resonator separate, secondary pulses, said secondary pulses being coupled out at the same time as the primary laser beam pulses but at a different locations and
   a couple-out modulater operative such that the pulse energy of the primary laser beam pulses can be adjusted by adjusting the division of energy between the primary and secondary pulses by way of adjusting said coupling out means.

20. A laser as recited in claim 19 wherein the parameters of the secondary beam pulses coupled out of the resonator are adjusted so that the beam parameters of the primary laser beam pulses can remain unchanged.

21. An apparatus as recited in claim 19 wherein the couple-out modulator is defined by a magneto-optical device.

22. An apparatus as recited in claim 19 wherein the couple-out modulator is defined by an electro-optical device.

23. An apparatus as recited in claim 22 is a Pockels cell.

24. An apparatus as recited in claim 22 wherein the pulse energy of the laser beam pulses is adjustable by varying the high voltage at the electro-optical couple-out modulator.

25. An apparatus as recited in claim 19 wherein the energy of the laser beam pulses is measured and used to control the operation of the couple-out modulator.

26. An apparatus as recited in claim 25 wherein the measured energy of the laser beam pulses is used to stabilize the energy thereof.

27. An apparatus as recited in claim 19 wherein the laser is pumped by one of laser diode and a dye-laser.

28. An apparatus as recited in claim 19 wherein the resonator includes a highly reflecting end mirror and a couple-out mirror and wherein said couple-out modulator is a Pockels cell and wherein said means for coupling out the secondary pulses from the resonator is a polarizing beam splitter.

29. An apparatus as recited in claim 28 wherein said Pockels cell is located between the couple-out mirror and the gain medium and wherein the polarizing beam splitter is located between the Pockels cell and the gain medium.

30. An apparatus as recited in claim 28 wherein said Pockels cell is located between the couple-out mirror and gain medium and wherein the polarizing beam splitter is located between the Pockels cell and couple-out mirror and further including a quarter wavelength plate located between the gain medium and the highly reflecting end mirror.

31. An apparatus as recited in claim 28 by wherein said Pockels cell is located between the highly reflecting end mirror and the gain medium and wherein the polarizing beam splitter is located between the gain medium and the couple-out mirror and further including a quarter wavelength plate located between the gain medium and the polarizing beam splitter.

* * * * *

UNITED STATES PATENT AND TRADEMARK OFFICE
CERTIFICATE OF CORRECTION

PATENT NO.: 6,028,870
DATED: February 22, 2000
INVENTOR(S): Nils Deutsch et al.

It is certified that an error appears in the above-identified patent and that said Letters Patent is hereby corrected as shown below:

On the line entitled "Assignee", change "Lamba Physik Gesellschaft zur Herstellung Von" to --Lambda Physik Gesellschaft zur Herstellung von--

Signed and Sealed this

Twenty-fourth Day of April, 2001

Attest:

NICHOLAS P. GODICI

*Attesting Officer*    *Acting Director of the United States Patent and Trademark Office*